Oct. 21, 1969   E. O. NORRIS   3,474,015
RECOVERY OF METAL VALUES FROM SEA WATER ENVIRONMENTS
Filed June 8, 1967   4 Sheets-Sheet 3

INVENTOR
EDWARD O. NORRIS

BY *Mandeville & Schweitzer*
ATTORNEYS

Oct. 21, 1969    E. O. NORRIS    3,474,015
RECOVERY OF METAL VALUES FROM SEA WATER ENVIRONMENTS
Filed June 8, 1967    4 Sheets-Sheet 4

INVENTOR
EDWARD O. NORRIS
BY Mandeville & Schevenell
ATTORNEYS

United States Patent Office 3,474,015
Patented Oct. 21, 1969

3,474,015
RECOVERY OF METAL VALUES FROM
SEA WATER ENVIRONMENTS
Edward O. Norris, 9 Ledgemoor Lane,
Westport, Conn. 06880
Continuation-in-part of application Ser. No. 488,451,
Apr. 15, 1965, which is a continuation-in-part of
application Ser. No. 628,458, Apr. 4, 1967. This
application June 8, 1967, Ser. No. 644,515
Int. Cl. C02b 1/82; C22d 1/00; B01k 1/00
U.S. Cl. 204—151         22 Claims

ABSTRACT OF THE DISCLOSURE

Apparatus and process for withdrawing sea water containing precious metal compounds from the sea bottom and the subsequent recovery of the precious metals in elemental form is disclosed.

The disclosed process includes the enrichment of the withdrawn sea water by oxidation and/or electrolytic means and the subsequent reaction of the precious metal from the enriched mixture with a suitable precipitating agent to form insoluble precious metal salts. To enhance the recovery of precious metals from the sea water, plant parts may be added to the mixture prior to the precipitation of the precious metals from the sea water mixture. The metallic precipitates may be further precipitated to remove any interfering substances present in the initially precipitated metallic compounds.

SUMMARY OF THE INVENTION

The invention is directed to the recovery of precious metals from sea water environments, particularly by extraction of precious metal compounds suspended or dissolved in the sea water, near the bottom sediments, and/or in or associated with the bottom sediments themselves. The processes and equipments of the invention take advantage of the natural concentrating processes of the plants and organisms of the sea, and also take advantage of certain biochemical processes to which the organic material of the sea bottom is or can be subjected, all to the end that significant quantities of precious metal values can be derived from natural sea water environments on an economically attractive basis.

RELATED APPLICATIONS

The present application is a continuation-in-part of my prior copending application Ser. No. 448,451, now abandoned, filed Apr. 15, 1965. It is also related to and forms a continuation-in-part of my copending application Ser. No. 628,458, filed Apr. 4, 1967; the latter is a continuation-in-part of my application Ser. No. 587,624, now abandoned, filed Oct. 18, 1966, which application was a continuation of my earlier application Ser. No. 366,102, now abandoned, filed May 9, 1964.

BACKGROUND OF INVENTION

It has long been recognized that enormous quantities of precious metals and other elements are contained in sea waters. However, despite the long existence of such knowledge, and the universal allure of the precious metals, such as gold, silver, and platinum, the recovery of these metals, insofar as is known, has never been accomplished on a commercially realistic basis. In this respect, while a wide variety of recovery processes and equipments have been proposed in the past, all of them are believed to involve processing costs which exceed the value of the recovered material, at least when attempted to be carried out on a commercial scale. In part, this is a function of the enormous quantities of material (i.e., sea water) that conventionally must be handled in order to derive significant amounts of precious metal values. In addition, the actual recovery of the precious metal values, known or believed to be present in the sea water, has proved to be very difficult.

The present invention is based in part upon the discovery that nature is continuously precipitating and concentrating metal compounds from the saline waters of the sea. The natural concentration processes result in part from the fact that certain microorganisms of the sea tend to combine with the very dilute metal compounds and then fall to the bottom sediments. In addition, the bottom sediments under relatively shallow seas, bays, inlets, estuaries, and sounds, all being more or less porous, contain certain microorganisms and decomposing organic matter, from which effective precipitants of the metal compounds are derived. The effective decomposition products are known to include $H_2S$, ammonium sulphide, and other ammonium compounds, a variety of amines and anolamines, in various combinations with $H_2S$, plus certain organic sulphides such as thio-compounds and xanthates. Fatty acids, and their esters, and other compounds are also a byproduct of this decomposition process, and many of these fatty acids have excellent extractive functions for many colloid metal sulphides from dilute aqueous suspensions.

The sea waters, continuously percolating into and through the bottom sediments, under the influence of tides, currents, wave action, and various thermal effects, continuously carry their very dilute metal compounds into contact with these natural precipitants. It is believed that valuable metal ions and compounds constantly are being precipitated, re-dissolved, and re-precipitated in the water containing decomposing sediments. Accordingly, with time, the precipitated metal compounds tend to become concentrated in certain sea bottom areas. This continuing activity appears finally to result in the development of concentrations of relatively stable organic or metallo-organic compounds of the desired metals. These more stable compounds may, however, be broken down under oxidizing conditions to provide a yellowish-brown sea water solution, containing desired precious metal values in solution or suspension and from which precious metal compounds may be precipitated under controlled conditions.

The natural precipitants formed by the decomposing sediments appear to be highly effective when associated with certain fine siliceous materials, particularly fine amorphous silica structures such as the residual shells of diatoms (diatomite).

In addition to the natural precipitating and concentrating action of the decomposing sediments, the presence of certain halophytic plants, particularly plants of the halophytic angiospermae type, appears to bear importantly upon the ability to derive precious metal values from sea bottom environments with high efficiency. This may be due to an enhanced concentrating action, by which the dilute metal values are extracted from the flowing sea waters and retained in more concentrated form in the plant materials. And it is also possible that the plants serve as an agency to promote the release of the precious metals in forms from which the elemental materials may be recovered. The advantageous effect of these plants appears to be further enhanced or additionally contributed to by their associated obligate epiphytic growths. For example, the presence of eel grass and shoal grass, and their associated obligate epiphytes, appears to have an extremely beneficial effect upon the overall process.

In accordance with other aspects of the invention, processing techniques and equipment of a novel nature are afforded for making effective withdrawals of bulk materials from selected areas of precious metal concentration, in a manner to enable economically feasible precious metal recovery to be carried out. In this respect, the invention provides for the substantial enrichment of sea water mixtures, prior to performing a sequence of recovery procedures thereon. By this means, the handling and processing of bulk materials is greatly reduced, in relation to the amounts of recoverable materials therein, whereby critically significant processing economies are realized.

Effective enrichment of the sea water mixtures to be processed may be accomplished in accordance with the invention by several procedures, some of which may be used to advantage in combination. Thus, sea bottom areas initially chosen for their high concentration of precipitated metal values are controllably disturbed in a predetermined area, as by means of gas or water flow, brush abrading, etc., and a slurry of sea water and sediment fines from the disturbed locality is withdrawn for processing. The disturbing activity may be carried out under oxidizing conditions, and/or the withdrawn slurry may be subsequently retained under oxidizing conditions, typically with aeration. If desired, micro-organisms may be added in a retaining tank, and natural or artificial sunlight may be employed, to promote the processes of organic decomposition.

Alternatively, or in addition, the slurry of sea water and sediment fines may be electrolytically treated in the anode chamber of an electrolytic cell; the electrolytic treatment is particularly significant and desirable where halophytic plants are associated with the slurry and/or where the bottom sediments are of a generally siliceous composition. As a result of these processes, significantly increased amount of the available precious metal compounds are carried by the process slurry in the first instance, and are then caused to go into solution or suspension in the sea water, in a condition suitable to be subsequently precipitated therefrom and recovered.

A further significant aspect of the invention resides in the provision of especially advantageous processing techniques for effectively extracting the precious metal values which are made available in solution or suspension in the processed sea water slurries. In this respect, the precious metal values have proven to be extremely elusive and extraordinarily difficult to recover from the sea water mixture. This is believed to be due to the presence, in association with the precious metal compounds, of what may be described as an interfering substance. Thus, I have found that merely precipitating the available precious metal compounds from the sea water mixture, as in the form of sulphide compounds of the precious metals, often is inadequate to enable these sulphide or other compounds to be processed conventionally for effective recovery of the elemental metals, because of the presence of this interfering substance. In accordance with a significant aspect of the invention, however, the initially precipitated compounds may be re-dissolved in a manner which enables the interfering substance to be isolated as an insoluble and removed. Thereafter, the re-dissolved compounds may be reprecipitated as sulphide compounds, free of the interfering substance, or otherwise processed for elemental metal recovery by more or less conventional techniques.

The above and other significant aspects of the invention will be made more fully apparent by reference to the following description and the accompanying drawings.

DESCRIPTION OF PREFERRED EMBODIMENTS OF THE INVENTION

In accordance with significant aspects of the invention, precious metal values may be derived from sea water environments in an economical manner by initially taking advantage of the concentrating activity carried out by natural, biochemical processes of the sea. Thus, the raw materials of the process consist of sea bottom materials and sea water from selected sea bottom areas, in which the concentrations of the sought-for metal values are significantly higher than is normal for the open sea waters, for example, by reason of the selective combination of the metals, in some form, with certain micro-organisms and plants of the sea.

In addition to the selection of sea bottom areas in which there are natural concentrations of the desired metal compounds, it is a significant aspect of the invention to further select, for the withdrawal of raw materials, sea bottom areas in which the natural processes of organic decomposition and other naturally occurring biochemical processes have rendered the metallo-organic compounds soluble in sea water or capable of being broken down and rendered soluble. These areas are generally shallow, desirably having siliceous or calcareous based bottom sediments and being associated with certain halophytic plants. Certain coral sea areas, for example, may provide many advantageous locations for carrying out the process to advantage.

After selection of an appropriate sea bottom area, the process is commenced by the withdrawal of sea water mixtures from the sea bottom regions, which mixtures are especially rich in metal values carried in solution or suspension. In certain instances, sea water adjacent the bottom sediments may be so rich in dissolved and suspended metal values as to enable the process to be carried out economically with the naturally occurring waters. However, typically and in accordance with an important aspect of the invention, the sea bottom sediments are first disturbed in a localized area, and a slurry of sea water and suspended sediment fines is withdrawn from the disturbed area. To this end, the process advantageously employs an abrader unit 10, shown in detail in FIGS. 3 and 4.

Figure 4:
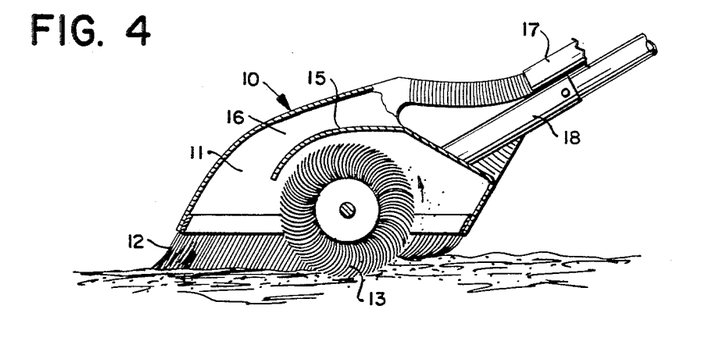

Typically, the abrader unit 10 may incorporate a housing or enclosure 11 provided about its bottom edge with brushlike strips 12. A rotary brush element 13 is journalled in the housing and is arranged to be driven (counterclockwise, as shown in FIG. 4) by suitable means, such as hydraulic motors 14. A baffle plate 15 forms a turbulence chamber about the rotary brush 13 and serves to deflect coarse particles away from a flow outlet 16, which leads to a withdrawal duct 17.

Figure 3:
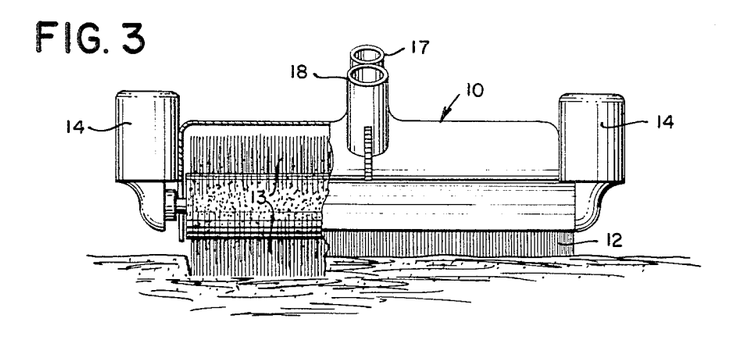
FIGS. 3 and 4 are elevational and cross-sectional views, respectively, of an abrading and collecting apparatus advantageously utilized in the process of the invention for withdrawing enriched slurries from sea bottom areas.

The entire abrader unit 10 is adapted to be drawn slowly over selected areas of sea bottom sediments, as by means of a yoke 18 connected to a marine vessel or other facility. As the unit is thus traversed over the bottom, the brush 13 is rotated to disturb the upper layers of the sea bottom sediments and cause the sediment fines to be turbulently intermixed with the sea water, within the abrader housing 11. The disturbance of the sediments is accompanied by withdrawal of sea water through the duct 17, such that the sea water mixture thus drawn up from the sea bottom consists of a slurry of the sediment fines and the water.

In some cases, it may be desirable to utilize, instead of the abrader brush 13, one or more rows of rake-like tines (not shown) adjustable secured within the abrader housing. These tines may be associated with high pressure water jets whose streams are directed into the grooves formed in the sediments by movement of the tines.

In any case, the disturbance of the sea bottom usually may be limited to a depth of about 2 or 3 inches, because my experience indicates that the recoverable metal values are found predominantly in the fines of these upper layers of bottom material. The "fines" component of the bottom materials may be characterized generally as metallo-organic material, usually of very fine particle size, and typically is readily distinguishable from the accompanying coarser, essentially inorganic materials in the nature of sand. Desirably, the abrader unit is effective to separate the fines from the coarser particles, and to extract from the sea bottom area a relatively rich slurry of fines in sea water, consisting of possibly as much as 50% or more of solid materials.

Under certain circumstances, where the sea bottom sediments have been naturally exposed to proper oxidizing conditions, the metal compounds associated with the sediments may be sufficiently soluble in the sea water or may be rendered soluble by short exposure to oxidizing conditions, such as by bubbling chlorine gas through the slurry of sea water and sediment fines during the withdrawal. More typically, however, additional processing sequences are needed, usually including aging of the withdrawn slurry under oxidizing conditions, preferably with aeration, and perhaps with the addition of micro-organism cultures to stimulate breakdown of the metal compounds, and possibly enhanced further by natural or artificial sunlight. In accordance with one aspect of the invention, this processing sequence may be expedited significantly and made to yield a broader range of metal values by carrying out a preliminary electrolysis of the sea water slurry as will be explained in more detail. This is particularly true of siliceous based bottom sediments, which may be readily processed at low pH conditions.

Figure 1:
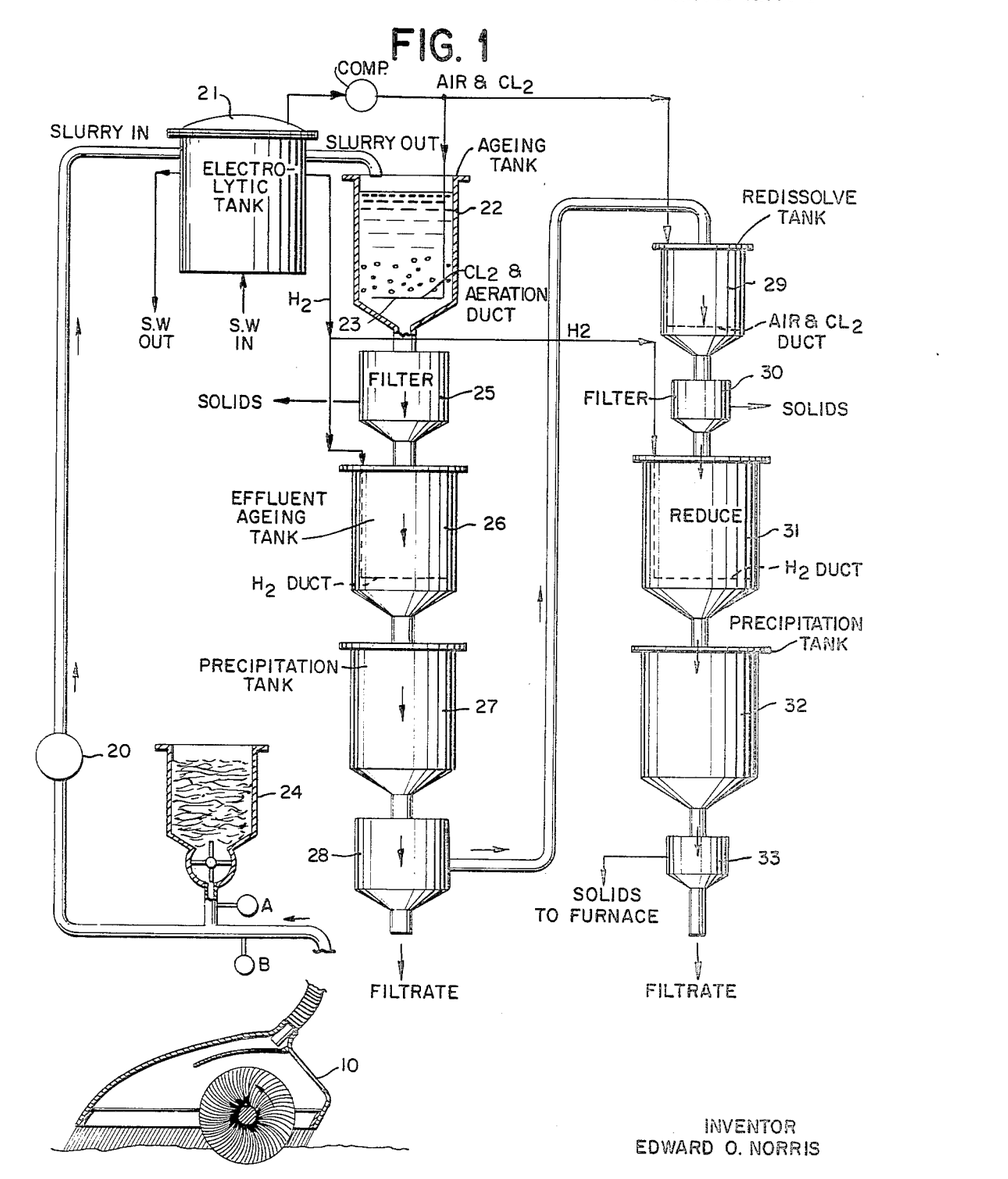
FIG. 1 is a simplified, schematic flow sheet representation of an advantageous processing sequence, for recovering precious metal values from sea water environments in accordance with the invention.

In the system schematically illustrated in FIG. 1, the withdrawn enriched slurry is flowed from the abrader 10, by means of a pump 20, and is directed into an electrolytic cell designated generally by the reference numeral 21. By means to be described in more detail, the slurry is electrolytically treated in the anode chamber of the cell 21, the process being accompanied by the evolvement of chlorine gas.

The electrolytic process, carried out in the cell 21, serves to break down the chlorides and other compounds of the slurry into hypochlorous and hydrochloric acids, evolving chlorine and forming certain trace oxidizing compounds based on the nitrates and, for example, the bromides in natural sea water. These effectively break down the metal complexes in the sediment fines to soluble metal ions and/or colloids, to enable further processing to be carried out in a highly expeditious manner. This process normally will operate without the necessity for purchased extraction reagents; however, under certain circumstances the addition of relatively small quantities of commercial nitrates, nitric acid, and/or bromides to the sea water slurry may be justified.

The slurry directed to the electrolytic cell may advantageously have added thereto certain plants or plant parts. Typically these will be introduced into the withdrawn slurry by means of a chopper-feeder means 24 of suitable form, in which the plants may be mixed with a small quantity of sea water, chopped, and introduced into the slurry stream on the intake side of the pump 20.

The added plant parts are derived from certain halophytic plants. Plants of the halophytic angiospermae type are particularly effective. Eel grass (*Zostera marina*) and shoal grass (*Syringodium filiforme*), which are rooted in the sea bottom sediments, have been observed to be very effective. The obligate epiphytic associates of these plants also are included to advantage. These may include the epiphyte, Smithora, which has an obligate relationship with *Zostera marina*, and other marine algae such as Cyanophyta, Bostrychea, and Caloglossa.

The precise agency of these plants is not fully understood. It is possible that they serve as concentrators of the metal compounds, or provide an action in the breaking down of the compounds to a recoverable form, or perhaps both. Their presence in the processed slurry and their natural occurrence, rooted in the sediments from which the slurry is derived, are observed to enhance the processing recovery significantly.

As indicated in the flow diagram, the electrolytically treated slurry is flowed to an aging tank 22, which desirably is a shallow vessel provided with aeration means 23 in its bottom, through which gas may be bubbled to maintain the sediment fines agitated and in suspension. The agitating gases advantageously are a mixture of chlorine gas and air, as derived from the evolvements of the electrolytic cell, and serve to provide oxidizing conditions, under which additional metallo-organic compounds of the sediment fines are caused to go into solution or suspension in the sea water.

In the performance of the electrolytic treatment, the slurry advantageously is heated, as will be described in more detail, and the treated solution thus is warm at the commencement of the aging treatment, which promotes the aging reactions. The optimum aging period for a given type of slurry composition may be empirically determined.

At the conclusion of the aging process, the sea water, with its dissolved and/or suspended metal compounds, is separated from the sediment fines, as by means of a suitable filter or centrifuge 25 or, if appropriate, by decantation. The filtered solids desirably are washed, with the effluent from washing being added to the filtrate, and the solids are then discarded.

In the specifically illustrated process, the filtrate and wash effluent may be directed to a second aging vessel 26, in which hydrogen gas, also derived from the electrolytic cell, is bubbled through the liquid. This neutralizes any residual oxidizing action which may otherwise be continuing to occur in the liquid.

Following aging, the sea water solution, containing dissolved and/or suspended metal compounds, is directed to a first precipitation vessel 27. In this vessel, the sea water solution is reacted to derive precipitated compounds of the desired metals. Advantageously, the enriched and conditioned sea water solution is reacted with soluble sulphide compounds, such as hydrogen sulphide, sodium sulphide, etc., under low pH conditions, to derive precipitated sulphide compounds. The pH is desirably below 3.5 at this stage, and a pH of about 1.5 to 2.0 is considered preferable.

The materials in the first precipitating vessel 27 are separated, as in a suitable filter or centrifuge 28. The separated precipitates are further processed for derivation of the sought-for metals. The filtrate may then be discarded or, if desired, processed further to effect a sulphide or other precipitation at a significantly higher pH level of, say, about 6.0 to 8.0.

Under normal circumstances, when precious metals such as gold, silver, and platinum are processed to the form of sulphide compounds, the elemental metals are capable of being readily derived using conventional metallurgical techniques. However, as one of the significant discoveries upon which certain aspects of this invention are based, the precipitated compounds of precious metals, which are available at this stage of the sea water extraction process, contain or are in some way combined with an interfering substance which effectively precludes conventional recovery of the precious metals in usable form.

In accordance with one of the important aspects of the invention, the initially derived sulphide compounds of the precious metals are re-dissolved under conditions which enable the effective separation therefrom of the interfering substance, and then are further processed, as by re-precipitation of sulphide compound precipitates. The second stage precipitates are free of the interfering substance and are able to be processed in the usual ways to derive the elemental metals.

Referring still to FIG. 1, the first stage sulphide precipitates are treated in a re-dissolving vessel 29 with a warm solution of dilute HCl and an oxidizer. Chlorine, derived from the electrolytic cell 21, may be bubbled through the solution, or a small amount of $HNO_3$ may be added as the oxidizing agent. This procedure, while re-dissolving the precious metal sulphides, leaves a yellowish-white insoluble compound, which constitutes or includes the undesirable interfering substance.

After passing through a filter or centrifuge 30, the filtrate is directed to a reducing vessel 21, in which hydrogen gas, derived from the electrolytic cell, is bubbled through the solution, The solids, after washing, may be discarded.

The reduced filtrate may be directed to a second stage precipitation vessel 32, in which the precious metals are again precipitated as low pH sulphides, this time free of undesirable interfering substance. A pH of below about 3.5 is preferable at this stage, but is less important than in the first precipitation stage, because the higher pH compounds previously have been separated. The precipitated second stage sulphides, after separation from the filtrate in a filter or centrifuge 33, may be processed to elemental metal forms in accordance with established and well-known metallurgical procedures. The filtrate is discarded.

Alternatively, the reduced, re-dissolved metal compounds from the vessel 31 may be converted to elemental metal forms by electrolytic deposiiton processes, for example, using a rotating cathode.

Figure 2:
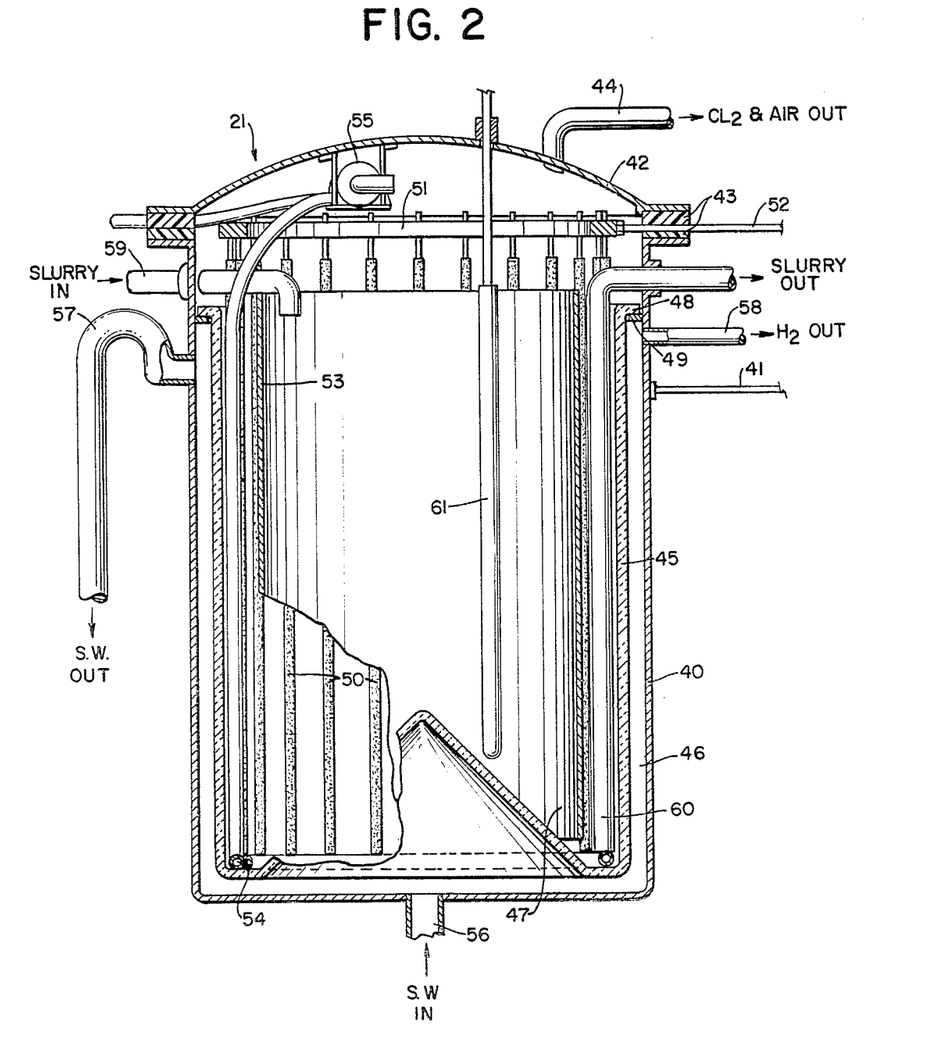
FIG. 2 is a cross-sectional view of an electrolytic cell apparatus advantageously utilized in the processing of sea water slurries in accordance with the invention.

An advantageous form of the electrolytic cell, for use in the process of FIG. 1 as necessary or expedient, is shown in more detail in FIG. 2. The cell, designated generally by the numeral 21, includes an outer tank body 40, which is formed of a material such as stainless steel. The outer tank body is connected at 41 to the negative terminal of a suitable (e.g., four volt) D.C. power source and thus serves as the cathode element of the cell.

The cell is closed for containment of evolved gases by means of a suitable cover 42 mounted on the upper end of the outer tank 40 and sealed by a gasket element 43. A gas outlet 44 is provided in the cover 42, and this outlet serves to exhaust evolved chlorine and air, as will appear.

Mounted within and spaced slightly from the walls of the outer tank 40 is a porous vessel 45 which serves to divide the cell 21 into its cathode and anode chambers 46, 47. The porous vessel may be supported in sealed relation to the outer tank 40 by means of an outwardly extending annular flange 48 engaging an inwardly extending annular flange 49 provided on the tank wall. Advantageously, the bottom wall of the porous vessel 45 is generally in the form of a cone.

Within the anode chamber 47, but positioned closely adjacent the side wall of the porous vessel, is a circular array of suspended, vertically disposed graphite anode elements 50, typically of about one inch diameter. These are connected, by means of a circular anode bus bar 51 disposed in the top portion of the cell, to the positive terminal 52 of the power source.

As indicated in FIG. 2, the anode chamber 47 of the cell is divided by means of an annular baffle 53 (advantageously non-conductive) into an annular treatment zone, closely containing the anode bars 50, and a slurry supply zone in the center regions of the cell. The bottom of the treatment zone contains an annular aeration pipe 54, through which chlorine gas and air are bubbled upwardly in the treatment zone. As indicated in the drawing, the lower end of the baffle 53 is spaced slightly above the bottom wall of the porous vessel 45 so that, during operation of the cell, the aerating action of the gas issuing from the pipe 54 causes slurry to feed along the conical bottom, from the supply zone to the treatment zone. The aeration pipe 54 is supplied with air and chlorine gas evolved from the electrolytic process, by means of a compressor 55, advantageously located in the upper portion of the cell and having an intake line exposed to the contained gases above the anode chamber.

The cathode chamber 46 of the cell is provided with inlet and outlet flow connections 56, 57 for fresh sea water, to carry away the alkaline compounds which otherwise will tend to build up in the cathode region during electrolytic treatment of the slurry. A gas outlet line 58 is provided in the upper extremity of the cathode chamber, for removing hydrogen gas evolved during the treatment.

Suitable inlet and outlet pipes 59, 60 for the raw and processed slurry are arranged to open into the anode chamber. The raw slurry, advantageously containing up to 50% or more of sediment fines and chopped plant parts, is discharged near the upper portion of the anode supply zone, while the processed slurry may be withdrawn from lower portions of the anode treatment zone. The anode chamber also is provided with suitable immersion heater elements 61, supported by the cover 42, for elevating the temperature of the slurry to expedite the treatment.

The electrolytic treatment described is particularly desirable for the processing of siliceous based sediments and serves not only to expedite the overall processing but also to improve the yield of important metal values, such as gold and platinum. Additionally, the electrolytic treatment appears to be especially significant in connection with the treatment of bottom sediments in which are incorporated effective varieties of halophytic plants and their epiphytes. There may be an important relationship between the use of the electrolytic procedure and the derivation of desired compounds through the agency of the plant parts.

Electrolytic treatment of certain calcareous based sediments may involve increased processing costs, because the inherent alkalinity of the material causes difficulty of reducing the pH of some of these sediments to levels at which the electrolysis proceeds on an optimized basis, at least without reagent additions. In the processing of siliceous based sediments, the evolvement of chlorine in the anode chamber results in the formation of hypochlorous and hydrochloric acids, which readily lower the pH of the slurry to levels of, say, about 1.5.

Figures 5, 6, 7:
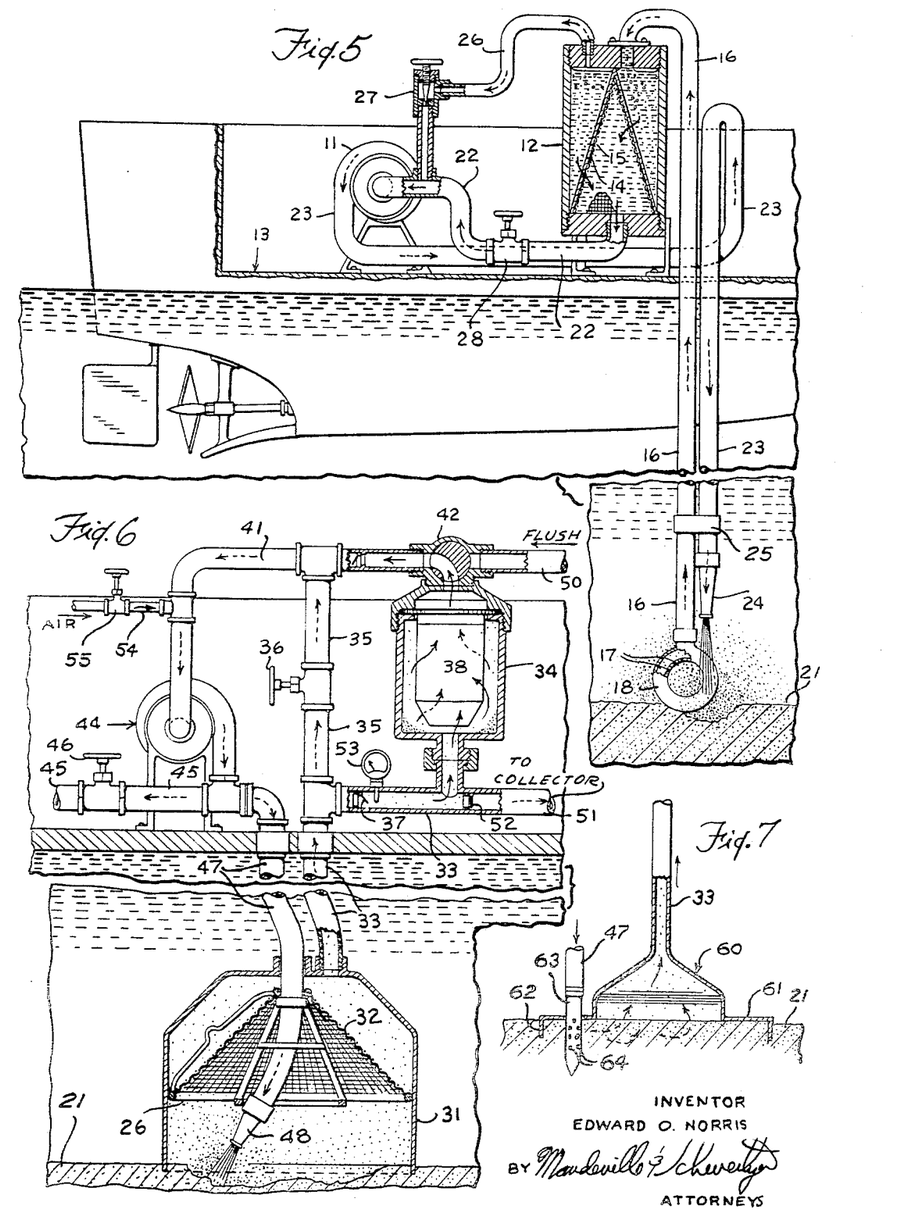
FIGS. 5 and 6 are simplified illustrations of systems which may be employed to advantage in the collection and processing of enriched sea water slurries in accordance with the invention.
FIG. 7 is a simplified illustration of a modified form of apparatus for effecting the withdrawal of enriched sea water slurries from sea bottom areas.

In FIGS. 5–7 there are shown modified forms of systems for the collection and treatment of slurries of sea water and sediment fines, in which the collection process is accompanied by aeration of the slurry under oxidizing conditions. By this means, aging of the slurry under oxidizing conditions may be expedited. In selected sea bottom areas, where the bottom sediments have been exposed to particularly effective natural oxidizing conditions, the additional oxidation derived from the collection process may be adequate to enable the recovery process to be carried out with desirably high efficiency. More typically, however, electrolytic treatment and/or holding in an aging tank as above described is appropriate in order to break down the metal compounds to soluble and/or colloid forms in desired amounts.

In the arrangement of FIG. 5, a pump 111 and a cylindrical collecting chamber 112 are carried in a boat 113. The chamber 112 contains a collector element 114 in the form of a cone of pile fabric composed of fibers having a large surface area and carrying a sensitizing coating such as zinc sulphide suited to collect the metal ions from the sea water. This fabric cone is supported by a frame 115. A flexible hose 116 is connected to the top of the chamber 112 with its open end 117 carrying a weight 118 disposed at the sea bottom 121 at the zone of collection. A pipe 122 having a valve 128 is connected from the bottom of the collecting chamber 112 to the intake side of the pump 111. The pump discharge is connected by a hose 123 to a nozzle 124, positioned to direct a jet of water onto the sea bottom near the intake end of the hose 116. An air pipe 126, having a needle valve 127, is connected from the top of the chamber 112 to the intake side of the pump 111 for removing air from the chamber and also for mixing air with the water which is supplied to the jet.

In the operation of the FIG. 7 apparatus, the sea bottom in the zone of the hose intake is agitated and disturbed by the water jet from the nozzle 124, and the organic components are partially oxidized by the air which may be introduced into the water in the pump 111, so as to improve the solubility of the metal compounds and enrich the metal compounds dissolved in the adjacent sea water. The enriched sea water slurry is circulated through the hose 116 to the collecting chamber 112 until the desired quantity of metals has been collected on the collector fabric 114.

The fibers on the collector 114 may be sensitized by a surface coating of an adsorbed sulphide such as zinc sulphide, which is electropositive with respect to the metals to be collected. As the sea water passes over these fibers, the electro-negative metal ions from the sea water are attracted to the electropositive metal sulphide ions and collect on the fibers and cause them to turn a dark color. The collector fabric may then be processed for the removal of the metal ions and the recovery thereof, as in accordance with the processes set forth in my copending application Ser. No. 628,458.

In the system of FIG. 6, the sea water and sediment fines are withdrawn from a cone shaped bell 131, having an open end resting on the sea bottom and provided with a screen 132 to remove large particles. The top of the bell 131 is connected by a hose 133, through a check valve 137 and a flow meter 153, to the bottom of a filter chamber 134 and to a by-pass line 135 having a control valve 136. The chamber 134 contains a filter cartridge 138 having a cylindrical surface composed of a filter element such as fabric through which the water is passed inwardly. The top of the chamber 134 is connected through a valve 142 and a pipe 141 to the intake side of a pump 144.

The discharge side of the pump is connected by a line 147 to a nozzle 148, which is adapted to be lowered to the sea bottom. A discharge line 145, controlled by valve 146, also is connected to the pump discharge for transfer of the enriched sea water slurries when desired, to a settling or aging tank, not shown.

Air or other suitable oxidants in controlled quantities may be introduced through duct 154, controlled by valve 155, into the water flowing into the pump 144, where it is mixed with the water flowing to the nozzle 148.

For reverse flush purposes, a pipe 150 is arranged by suitable adjustment to supply water under pressure to the top of the chamber 134. The reverse flush water and fines are removed from the bottom of the chamber through a pipe 151 having a check valve 152 therein, and are fed to a settling tank.

The system of FIG. 6 is particularly adapted for building up the metal concentration in solution or suspension in the water by recirculation so as to facilitate the subsequent recovery of the metal values on an economic basis. In operation, the sea bottom is agitated by the water jet from the nozzle 148. This causes the fines in which the metal values are concentrated to be separated from the larger particles. The organic compounds which are associated with the fines may be oxidized by the air or other oxidizing agency introduced into the water in the pipe 154, and the metal values thus tend to be transferred to the circulating water due to their increased solubility and due to the frictional contact of the agitated particles. The enriched water and fines are withdrawn through the hose 133 and may be caused to recirculate through the pump 144 to the nozzle 148 by opening the valve 136 in the by-pass line 135. During the recirculation, the water continuously passes over and through the sediments under the bell and becomes further enriched with metal values.

If the water which is withdrawn from the zone of agitation contains an excessive quantity of fines or other solid particles, all or a portion of the water may be passed through the filter chamber 134 by closing or partly closing the valve 136 in the by-pass line 135. The fines are thus removed by the filter 138 and when they have built up to an undesired extent on the surface of the filter 138, the filter element may be cleaned by a reverse flush cycle. The flush water and fines may be removed through the line 151 and fed to the settling tank wherein the fines are settled out and may be allowed to remain in contact with the sea water for several hours. The fines may be agitated periodically by bubbling air or air and chlorine gas therethrough so as to subject the organo-metallic complexes which are closely associated with the detrital material in the fines to oxidizing conditions. In this way, additional metal compounds are caused to go into solution or suspension with the sea water. The agitation, in addition to subjecting the fines to oxidizing conditions, causes abrasion by contact between the particles which assists in stripping the metal complexes from the surfaces of the detrital particles. The metal content can then be recovered in accordance with the process generally illustrated in FIG. 1.

Alternatively, the filter element 138 in the chamber 134 may be replaced by a collector element such as the collector element 114 of FIG. 5. In this case the water may be recirculated through the by-pass pipe 135 as above described until the metal content has been built up to the desired extent, after which the valve 135 may be closed and the enriched water from which the fines have preferably been removed may be caused to pass through the chamber 134 in contact with the collector element 114 therein. When the metal values have been transferred to the collector element, it may be removed and processed for the recovery of the metal values as above described.

FIG. 7 illustrates a further embodiment of the invention wherein an oxidizing zone is caused to extend to a greater depth below the surface of the sea bottom in the collection area, and wherein sea water is caused to circulate through the sediment beneath a collecting bell. The apparatus is similar to that described in connection with FIG. 6 except that the bell 131 of the FIG. 6 system is replaced by a pressure resistant cone-shaped bell or collector 160 having at its lower edge an outwardly extending flange 161 of substantial extent and having a peripheral downwardly extending flange 162 which is adapted to extend into the sediment of the sea bottom. The peak of the bell 160 is connected to the intake hose 133 for the slurry as in FIG. 6. The line 147 from the discharge side of the pump 144 in this instance may be connected to a pipe 163 having a plurality of perforations 164 around its periphery through which the sea water, preferably containing an oxidant, is to be discharged into the sediment. The pipe 163 extends downwardly through a suitable opening in the flange 161 of the bell 160 and projects downwardly into the sediment of the sea bottom.

In the operation of the FIG. 7 apparatus, the sea water and oxidant is discharged from the openings 164 in the pipe 163 directly into the sediment in the sea bottom. This produces an oxidizing zone which tends to oxidize the organic material and increases the solubility of the metal compounds as above described.

While air and chlorine gas have been referred to as typical oxidants to be used in the various described procedures, other suitable oxidant gases, such as ozone, may be used, and dilute solutions such as of hypochlorite, sodium peroxide and, in some cases, sulphuric acid may also be used. Gaseous oxidants are advantageous in many cases, because of their increased tendency to disturb the sea bottom sediments and to assist in the entrainment of the sediment fines in the withdrawn sea water slurry.

The processes of the invention enable precious metal values to be derived from sea water environments on a consistent, economically feasible basis: first, because the sea water slurries, forming the raw materials of the process, are selected to contain natural concentrations of the sought-for metals resulting from biochemical or biochemically derived actions; second, because the invention enables the collected sea water slurries to be enriched in metal values and conditioned to place their metal values in a soluble or colloidal form from which further recovery may effectively proceed; and, third, because the invention provides highly effective procedures for enabling the precious metals to be recovered in elemental form from their soluble or colloid condition.

One of the important practical aspects of the invention derives from my discovery that, even in sea bottom regions rich in biochemically concentrated metal values, it is important to effect dissolving or suspension of the metal compounds in the sea water, in order to accommodate the subsequent recovery procedures on a practical basis. While the necessary solubility of the metal compounds occasionally is realized under natural conditions, where the metal compound-bearing sediments are exposed to naturally occurring oxidation, it is most generally necessary to artificially process the collected slurries. In appropriate cases, mere exposure to oxidizing conditions (e.g., bubbling chlorine gas) during the collection procedures or in a holding tank may be adequate, and the inventive concepts include these procedures. However, for more consistently practical commercial scale recovery operations, electrolytic treatment of the metal compound-bearing slurry in the anode chamber of an electrolysis cell is particularly desirable; it greatly expedites the necessary conditioning of the slurry, reduces the raw materials storage capacity requirements to easily manageable proportions, and increases the recovery of such important elements as gold and platinum.

As will be understood, the described processes incorporate many inventive aspects, in that it is possible to dissociate some phases of the process from others, or to associate process phases in several combinations, depending upon such variables as the sea bottom concentrations, availability of halophytic plant parts and epiphytes, contributions by naturally occurring oxidizing processes, etc. Accordingly, reference should be made to the following appended claims in determining the full extent of the invention.

I claim:

1. The process of conditioning a sea water slurry including insoluble precious metal compounds for subsequent derivation of precious metal values therefrom, which comprises
   (a) introducing the slurry into the anode chamber of an electrolysis vessel,
   (b) partially isolating said slurry from the cathode chamber of said vessel, and
   (c) establishing a current flow between the anode and cathode chambers,
   (d) said current flow being sufficient to at least partially decompose and solubilize said precious metal compounds.

2. The process of claim 1, further characterized by said sea water mixture comprising a slurry of sea water and bottom sediment fines.

3. The process of claim 2, further characterized by said bottom sediment fines comprising siliceous-based bottom sediment material.

4. The process of claim 1, further characterized by said sea water mixture including halophytic plant parts.

5. The process of deriving precious metal values from sea water mixtures, containing precious metal complexes, which comprises
   (a) electrolytically treating the sea water mixtures in the anode chamber of an electrolysis vessel to at least partially decompose said precious metal complexes, and
   (b) deriving precious metal compound precipitates from the electrolytically treated mixtures,
   (c) said deriving step including the reaction of the decomposed precious metal complexes with a precipitating agent to form insoluble precious metal salts,
   (d) separating and treating the insoluble precious metal salts to derive precious metal values.

6. The process of claim 5, further characterized by
   (a) the sea water mixtures comprising slurries of sea water and bottom fines,
   (b) said slurry being derived by disturbing the sea bottom sediments and withdrawing sea water and entrained sediment fines from the area of disturbance.

7. The process of claim 6, further characterized by the electrolytically treated slurry being subjected to oxidizing conditions to biochemically condition the slurry for enhancement of the efficiency of extraction of the precious metal values.

8. The process of claim 5, further characterized by said sea water mixtures comprising slurries of sea water, siliceous-based bottom sediment fines, and halophytic plant parts.

9. A process for extracting metal values from sea water which comprises
   (a) withdrawing from the sea bottom area a portion of sea bottom sediment fines as a slurry in sea water,
   (b) treating the slurry to break down the metal compounds in the sediments and thereby to enrich the sea water in such values, and
   (c) thereafter separating the water from the sediments and extracting the metal values from the water,
   (d) said treating step including the electrolysis of said slurry in an anode chamber of an electrolytic cell.

10. The process of claim 9, further characterized by said bottom sediment fines forming siliceous based materials.

11. The process of claim 9, further characterized by active biological micro-organisms being added to the slurry to promote biochemical break down of the metal compounds.

12. The process of extracting precious metal values from sea water mixtures containing precious metal compounds, which comprises
   (a) introducing said sea water into the anode chamber of an electrolysis vessel,
   (b) partially isolating said mixture from the cathode chamber of said vessel,
   (c) establishing a current flow between the anode and cathode chambers to at least partially decompose the metal compounds,
   (d) introducing the electrolytically treated sea water into a precipitation vessel,
   (e) reacting the decomposed metal compounds with a precipitating agent to form insoluble salts of the precious metals,
   (f) treating said insoluble salts to derive precious metals in elemental form.

13. The process of claim 12, wherein
   (a) said precipitating agent is a soluble sulphide compound, and
   (b) said reacting step takes place in an acidic environment having a pH less than about 3.5.

14. The process of claim 12, wherein said treating step includes the steps of
   (a) dissolving said insoluble salts in a dilute solution of hydrochloric acid and an oxidizing agent, and
   (b) separating the dissolved salts from accompanying insoluble compounds.

15. The process of deriving precious metal values from sea water mixtures containing precious metal compounds, which comprises
   (a) enriching said sea water mixture by incorporating parts of sea bottom plants therein, (b) introducing the enriched sea water mixture into the anode chamber of an electrolytic cell, (c) passing an electrical current between the anode and cathode of said electrolytic cell to electrolytically decompose the enriched mixture, (d) introducing a precipitating agent into the electrolyzed sea water mixture, (e) said precipitating agent reacting with precious metal components in said electrolyzed sea water mixture to form insoluble precious metal salts, and (f) recovering elemental precious metal from said insoluble precious metal salts.

16. The process of claim 15, wherein said precipitating agent is a sulphide compound.

17. The process of claim 15, wherein said sea bottom plants are of the halophytic angiospermae type.

18. The process of claim 17, wherein said sea bottom plants include eel grasses (*Zostera marina*) and/or shoal grasses (*Syringodium filiforme*).

19. The process of deriving precious metal values from sea water mixtures containing precious metal compounds which comprises (a) exposing said sea water mixture to electrolytic oxidizing conditions to solubilize said precious metal compounds, (b) reacting the oxidized precious metal compounds with a precipitating agent to form insoluble precious metal salts, and (c) treating said precious metal salts to obtain elemental precious metals.

20. The process of claim 19, wherein (a) said precipitating agent is a sulphide compound, and (b) said reacting step takes place in an acid environment having a pH below about 3.5.

21. The process of claim 19, wherein chlorine gas is bubbled through said dilute HCl solution containing dissolved precious metal salts.

22. The process of claim 1, further including the step of oxidizing said sea water mixture to further decompose and solubilize said precious metal compounds.

References Cited

UNITED STATES PATENTS

| | | | |
|---|---|---|---|
| 738,758 | 9/1903 | Baxeres de Alzugaray | 75—101 |
| 2,144,743 | 1/1939 | Schulz | 299—8 |

OTHER REFERENCES

Hackh's Chemical Dictionary, 3rd ed., 1944, The Blakiston Co., QD5 H3 1944 C12.

JOHN H. MACK, Primary Examiner

A. C. PRESCOTT, Assistant Examiner

U.S. Cl. X.R.

75—101, 108; 204—109, 149, 152